United States Patent
Zhou

(10) Patent No.: US 12,483,717 B2
(45) Date of Patent: Nov. 25, 2025

(54) LOW-LATENCY AND HIGH-THROUGHPUT MOTION VECTOR REFINEMENT WITH TEMPLATE MATCHING

(71) Applicant: Avago Technologies International Sales Pte. Ltd., Singapore (SG)

(72) Inventor: Minhua Zhou, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 18/435,982

(22) Filed: Feb. 7, 2024

(65) Prior Publication Data

US 2024/0179335 A1 May 30, 2024

Related U.S. Application Data

(63) Continuation of application No. 17/488,094, filed on Sep. 28, 2021, now Pat. No. 11,917,176.

(51) Int. Cl.
*H04N 19/44* (2014.01)
*H04N 19/105* (2014.01)
(Continued)

(52) U.S. Cl.
CPC ........ *H04N 19/44* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 11,297,340 B2    4/2022   Chien et al.
11,917,176 B2 *  2/2024   Zhou ............... H04N 19/513
(Continued)

FOREIGN PATENT DOCUMENTS

WO    2020063598 A1    4/2020

OTHER PUBLICATIONS

Xiaoyu Xiu et al, "CE9-2. 2: Disabled decoder-side motion refinement (DMVR) and bidirectional optical flow (BDOF) for combined inter and intra prediction (CIIP)", 15. JVET Meeting; Jul. 3, 2019-Jul. 12, 2019; Gothenburg, SE; (The Joint Video Exploration Team of ISO/IEC JTC1/SC29/WG11 and ITU-T SG .16 ), n' o. JVET-O0108 Jun. 19, 2019, XP030205675.
(Continued)

*Primary Examiner* — Christopher G Findley

(57) ABSTRACT

A video decoder is provided that includes memory and a processor coupled to the memory. The processor may be configured to convert a bitstream into inter-prediction parameters and reconstruct motion data based on the inter-prediction parameters. The processor may further be configured to refine the motion data based on finding a match between a current template of a current picture and a reference template of a reference picture and perform a motion compensation operation with the refined motion data and a reference block to generate an inter-prediction block. The processor may be configured to add the inter-prediction block to an inter-residual block to produce a reconstructed block. The motion data may be reconstructed without refined motion data associated with a previous prediction unit.

16 Claims, 13 Drawing Sheets

(51) Int. Cl.
  *H04N 19/132* (2014.01)
  *H04N 19/159* (2014.01)
  *H04N 19/176* (2014.01)
  *H04N 19/513* (2014.01)

(52) U.S. Cl.
  CPC ......... *H04N 19/159* (2014.11); *H04N 19/176* (2014.11); *H04N 19/513* (2014.11)

(56) References Cited

U.S. PATENT DOCUMENTS

| | | |
|---|---|---|
| 2019/0238883 A1 | 8/2019 | Chen et al. |
| 2019/0394483 A1 | 12/2019 | Zhou et al. |
| 2020/0092545 A1 | 3/2020 | Xu et al. |
| 2021/0274213 A1 | 9/2021 | Xiu et al. |
| 2023/0007238 A1* | 1/2023 | Chen ...................... H04N 19/56 |

OTHER PUBLICATIONS

Office Action, Chinese Patent Application No. 202211174864.6, Jul. 18, 2024.
Office Action, Chinese Patent Application No. 202211174864.6, Dec. 30, 2024.

* cited by examiner

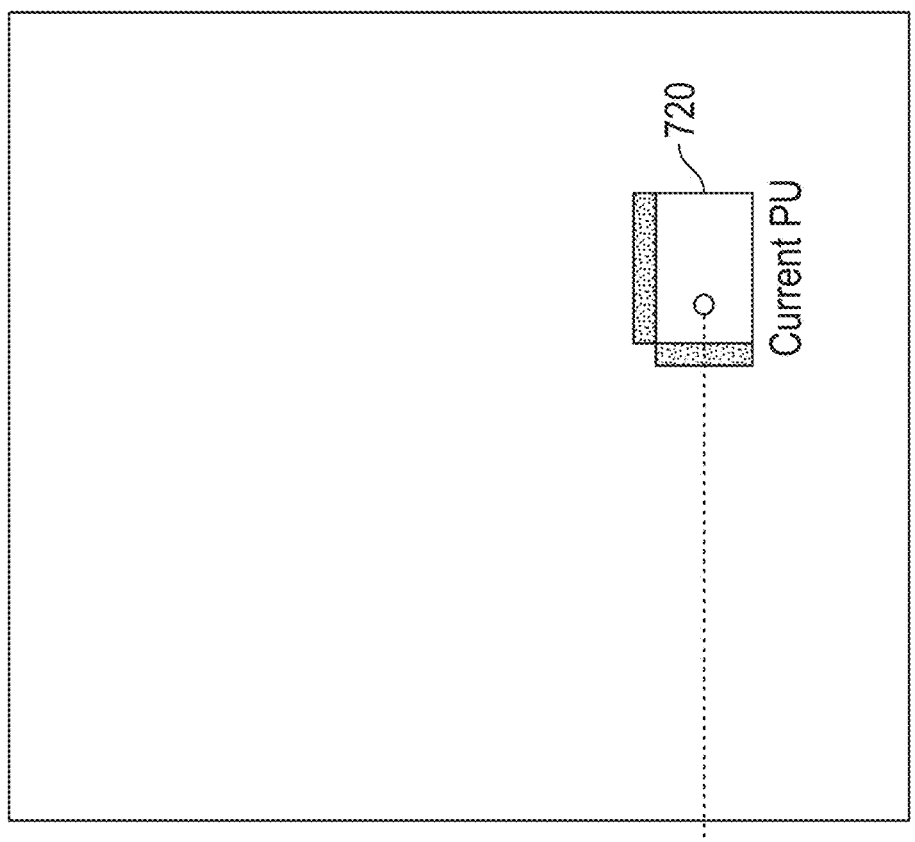
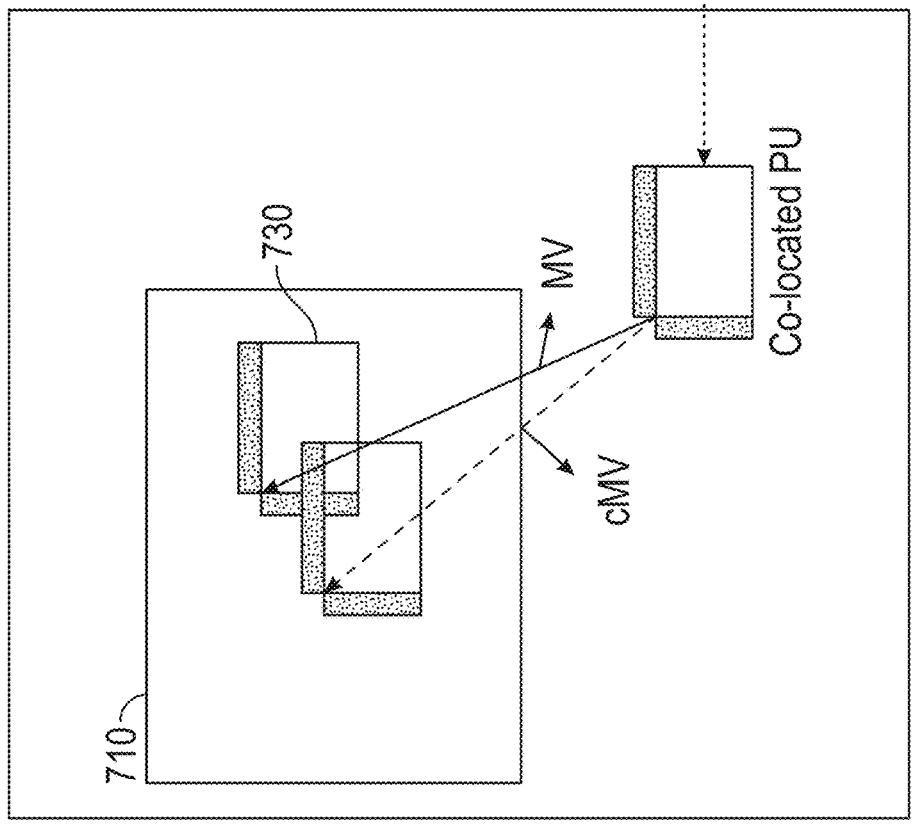
FIG. 7

LOW-LATENCY AND HIGH-THROUGHPUT MOTION VECTOR REFINEMENT WITH TEMPLATE MATCHING

CROSS-REFERENCE TO RELATED APPLICATIONS

This application is a continuation of U.S. patent application Ser. No. 17/488,094, filed on Sep. 28, 2021, and titled LOW-LATENCY AND HIGH-THROUGHPUT MOTION VECTOR REFINEMENT WITH TEMPLATE MATCHING, the contents of which are hereby incorporated by reference herein for all purposes.

TECHNICAL FIELD

The present description relates in general to video encoding and decoding including, for example, video decoding with motion vector refinement.

BACKGROUND

Video coding has been widely used for a variety of purposes such as compression of video for ease of transport, etc. Video coding has various areas that can be improved. For example, video coding may be improved for higher compression efficiency, higher throughput, etc. An encoded video has to be decoded by a decoder capable of motion-data reconstruction. The decoder-side motion estimation relies on the motion-data reconstruction to provide the initial motion vectors for refinement. The initial motion vectors also determine where to fetch reference blocks from the off-chip memory buffer for decoder-side motion-vector refinement and motion compensation.

BRIEF DESCRIPTION OF THE DRAWINGS

Certain features of the subject technology are set forth in the appended claims. However, for purposes of explanation, several embodiments of the subject technology are set forth in the following figures.

FIG. 7 is a diagram illustrating aspects of the DTM refinement search according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Figure 1:
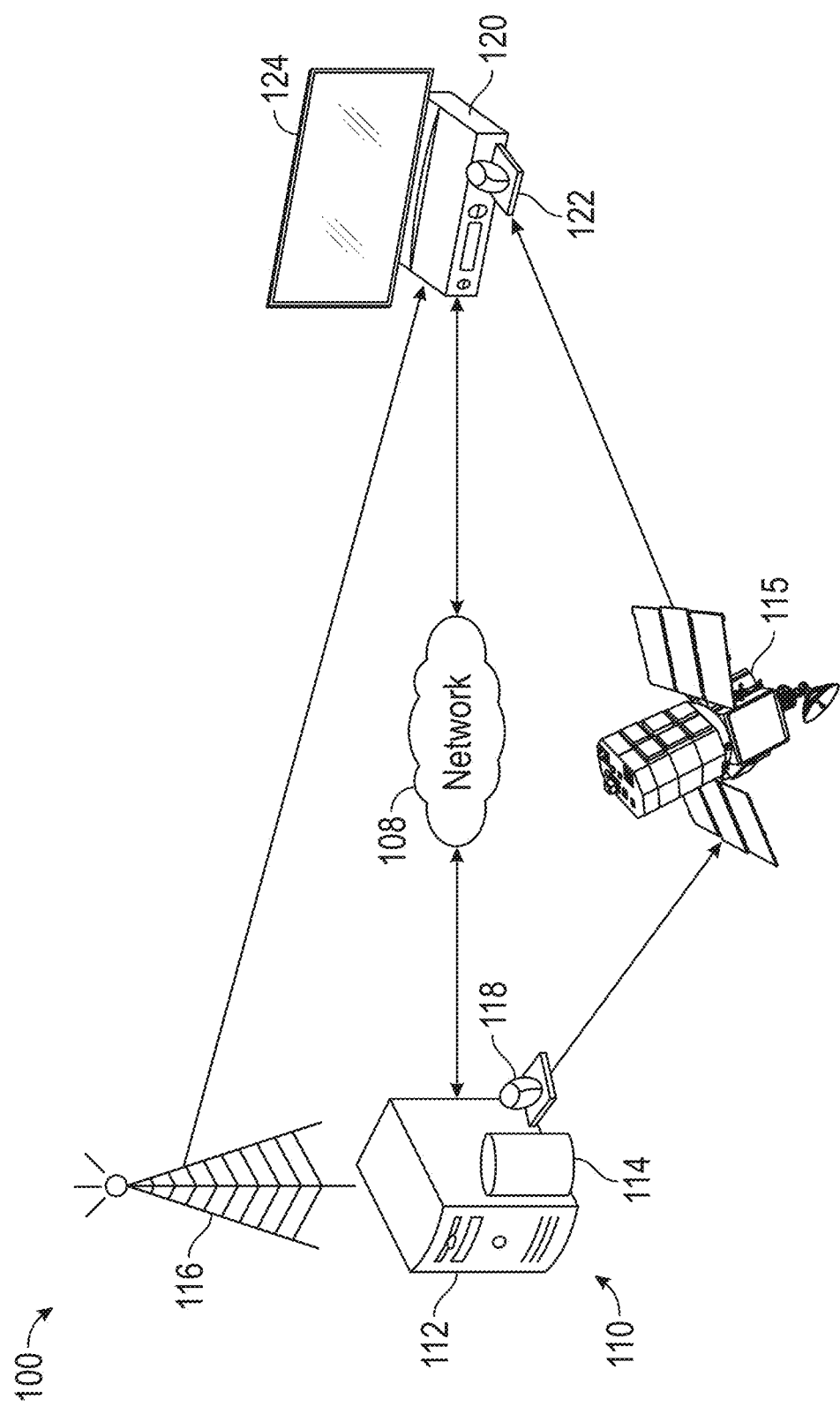
FIG. 1 illustrates an example of a network environment in which a video coding system may be implemented in accordance with aspects of the subject technology.

FIG. 1 illustrates an example of a network environment 100 in which a video coding system may be implemented in accordance aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes content delivery network (CDN) 110 that is communicably coupled to electronic device 120, such as by network 108. CDN 110 may include, and/or may be communicably coupled to, content server 112, antenna 116, and/or satellite transmitting device 118. Content server 112 can encode and/or transmit encoded data streams, such as AVC (Advanced Video Coding)/H.264 encoded video streams, HEVC (High-Efficiency Video Coding)/H.265 encoded video streams, VP9 encoded video streams, AV1 encoded video streams, and/or VVC (Versatile Video Coding)/H.266 encoded video streams, over network 108. Antenna 116 transmits encoded data streams over the air, and satellite transmitting device 118 can transmit encoded data streams to satellite 115.

Electronic device 120 may include, and/or may be coupled to, satellite receiving device 122, such as a satellite dish, that receives encoded data streams from satellite 115. In one or more implementations, electronic device 120 may further include an antenna for receiving encoded data streams, such as encoded video streams, over the air from antenna 116 of the CDN 110. Content server 112 and/or electronic device 120 may be, or may include, one or more components of the electronic system discussed below with respect to FIG. 13.

Network 108 may be a public communication network (such as the Internet, a cellular data network or dial-up modems over a telephone network) or a private communications network (such as private local area network (LAN) or leased lines). Network 108 may also include, but is not limited to, any one or more of the following network topologies, including a bus network, a star network, a ring network, a mesh network, a star-bus network, a tree or hierarchical network, and the like. In one or more implementations, network 108 may include transmission lines, such as coaxial transmission lines, fiber optic transmission lines, or generally any transmission lines, that communicatively couple content server 112 and electronic device 120.

Content server 112 may include, or may be coupled to, one or more processing devices, data store 114, and/or an encoder. The one or more processing devices execute computer instructions stored in data store 114, for example, to implement a content delivery network. Data store 114 may store the computer instructions on a non-transitory computer-readable medium. Data store 114 may further store one or more programs, for example, video and/or audio streams, that are delivered by CDN 110. The encoder may use a codec to encode video streams, such as an AVC/H.264 codec, an HEVC/H.265 codec, a VP9 codec, an AV1 codec, a VVC/H.266 codec, or any other suitable codec.

In one or more implementations, content server 112 may be a single computing device such as a computer server. Alternatively, content server 112 may represent multiple computing devices that are working together to perform the actions of a server computer (such as a cloud of computers and/or a distributed system). Content server 112 may be coupled with various databases, storage services, or other computing devices, such as an adaptive bit rate (ABR) server, that may be collocated with content server 112 or may be disparately located from content server 112.

Electronic device 120 may include, or may be coupled to, one or more processing devices, a memory, and/or a decoder, such as a hardware decoder. Electronic device 120 may be any device that is capable of decoding an encoded data stream, such as a VVC/H.266 encoded video stream.

In one or more implementations, electronic device 120 may be, or may include all or part of, a laptop or desktop computer, a smartphone, a tablet device, a wearable electronic device such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, electronic device 120 is depicted as a set-top box, e.g., a device that is coupled to, and is capable of displaying video content on display 124, such as a television, a monitor or any device capable of displaying video content. In one or more implementations, electronic device 120 may be integrated into display 124 and/or display 124 may be capable of outputting audio content in addition to video content. Electronic device 120 may receive streams from CDN 110, such as encoded data streams, that include content items, such as television programs, movies, or generally any content items. Electronic device 120 may receive the encoded data streams from the CDN 110 via antenna 116, via network 108, and/or via satellite 115, and decode the encoded data streams, e.g., using the hardware decoder.

Figure 2:
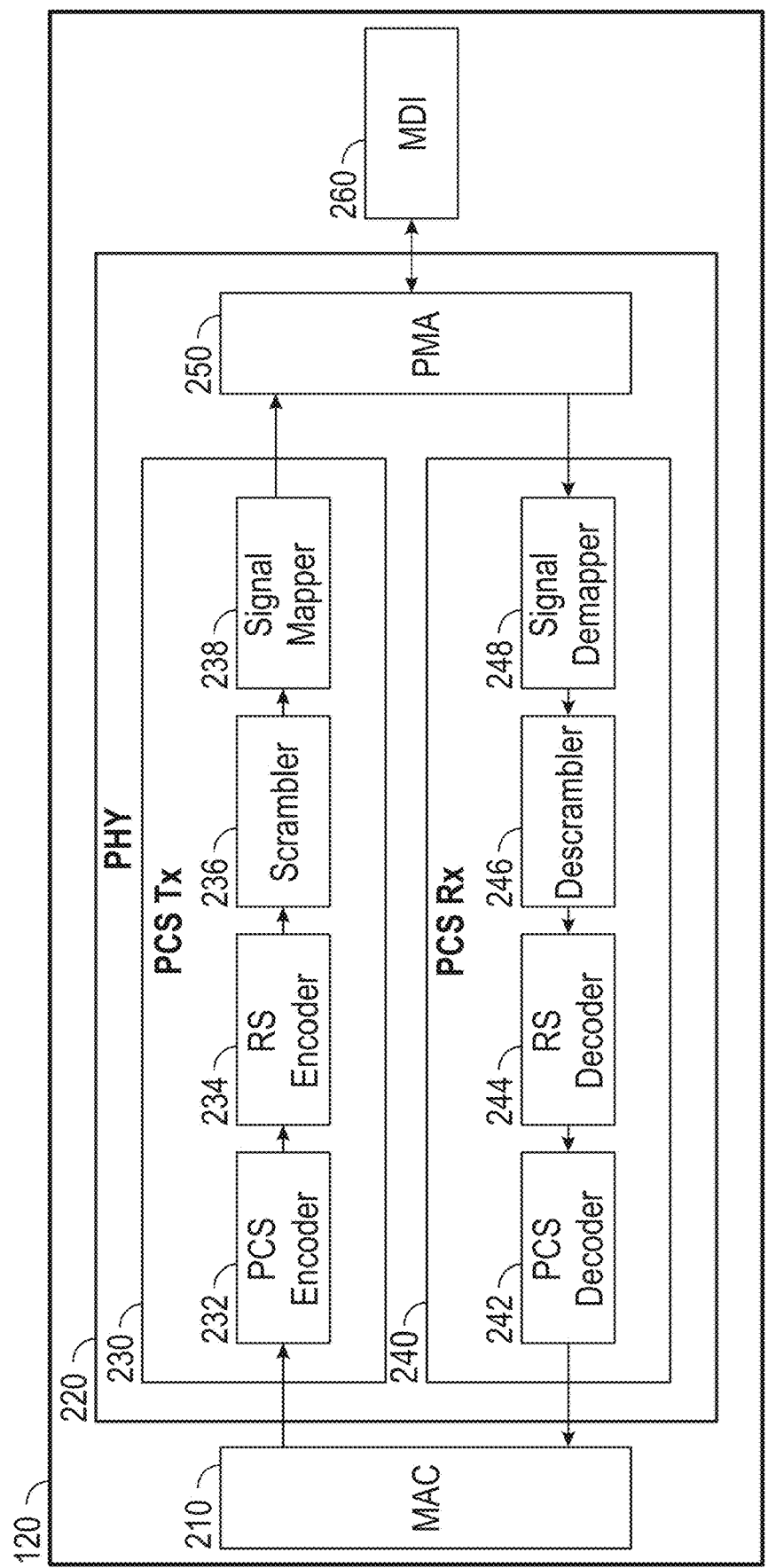
FIG. 2 illustrates an example of an electronic device that may implement aspects of the subject technology.

FIG. 2 illustrates an example electronic device 120 in accordance with aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 120 includes media access control (MAC) module 210, physical layer (PHY) module 220, and medium dependent interface (MDI) 260. PHY module 220 includes physical coding sublayer (PCS) transmit (Tx) module 230, PCS receive (Rx) module 240, and physical medium attachment (PMA) module 250. In one or more implementations, PCS Tx module 230 and PCS Rx module 240 may be combined in a single PCS module. PCS Tx module 230 includes PCS encoder 232, Reed Solomon (RS) encoder 234, scrambler 236, and signal mapper 238. PCS Rx module 240 includes PCS decoder 242, RS decoder 244, descrambler 246 and signal demapper 248. RS encoder 234 and RS decoder 244 may also be referred to as a forward error correction (FEC) encoder and decoder, respectively.

MAC module 210 is communicatively coupled to PHY module 220 via an interface, such as a gigabit medium independent interface (GMII), or any other interface, over which data is communicated between MAC module 210 and PHY module 220. PCS encoder 232 performs one or more encoding and/or transcoding functions on data received from MAC module 210, such as 80$b$/81$b$ line encoding. RS encoder 234 performs RS encoding on the data received from PCS encoder 232. Scrambler 236 is an additive or synchronous scrambler such that bit errors would not result in descrambler re-synchronization, as may be the case for multiplicative scramblers. Scrambler 236 is placed after RS encoder 234 and scrambles the RS encoded data by performing an exclusive-or (XOR) operation on the RS encoded data and a scrambling sequence. In one or more implementations, scrambler 236 is always enabled throughout normal data mode, low power idle mode (while RS encoder 234 is active), and low power idle refresh mode (when RS encoder 234 is inactive). In the low-power idle (LPI) refresh mode, the reference scrambler sequence can be regenerated for improved performance. Signal mapper 238 maps the scrambled data to symbols, such as by mapping 3-bits to 2-ternary pulse-amplitude modulation (PAM) symbols (3B/2T), or generally any bit to symbol mapping. The symbols are then passed to PMA module 250.

In one or more implementations, PHY module 220 may further include a hybrid circuit (not shown) that is configured to separate the echoes of transmitted signals from the received signals. Any residual echoes may be further removed by digital echo cancellation.

PMA module 250 performs one or more functions to facilitate uncorrupted data transmission, such as adaptive equalization, echo and/or crosstalk cancellation, automatic gain control (AGC), etc. MDI 260 provides an interface from PHY module 220 to the physical medium used to carry the data, for example, a transmission line, to a secondary electronic device (not shown for simplicity).

PMA module 250 receives symbols transmitted over the transmission lines, for example, from the secondary electronic device, via MDI 260 and provides the symbols to PCS Rx module 240. Signal demapper 248 maps the symbols to scrambled bits, such as by demapping 3-bits from 2-ternary PAM symbols. Descrambler 246 descrambles the scrambled bits using scrambler synchronization information received from the secondary electronic device, such as a scrambler seed that was provided by the secondary electronic device during the training stage. RS decoder 244 performs RS decoding on the descrambled data, and PCS decoder 242 performs one or more decoding and/or transcoding functions on data received from the RS decoder 244, such as 80b/81b line decoding. PCS decoder 242 transmits the decoded data to MAC module 210.

In one or more implementations, one or more of MAC module 210, PHY module 220, PCS Tx module 230, PCS encoder 232, RS encoder 234, scrambler 236, signal mapper 238, PCS Rx module 240, PCS decoder 242, RS decoder 244, descrambler 246, signal demapper 248, PMA module 250, MDI 260, or one or more portions thereof may be implemented in software (e.g., subroutines and code), may be implemented in hardware (e.g., an application-specific integrated circuit (ASIC), a field programmable gate array (FPGA), a programmable logic device (PLD), a controller, a state machine, gated logic, discrete hardware components, or any other suitable devices) and/or may be implemented in a combination of both.

Figure 3B:
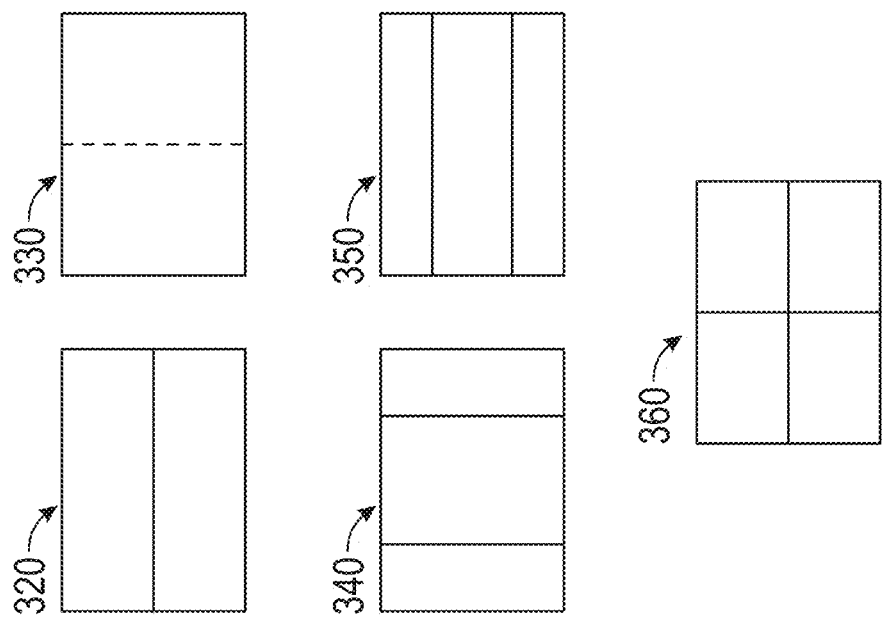
FIGS. 3A and 3B illustrate a schematic diagram of an example of a block partitioning structure used in versatile video coding (VVC) standard and an example of a recursive splits scheme.
Figure 3A:
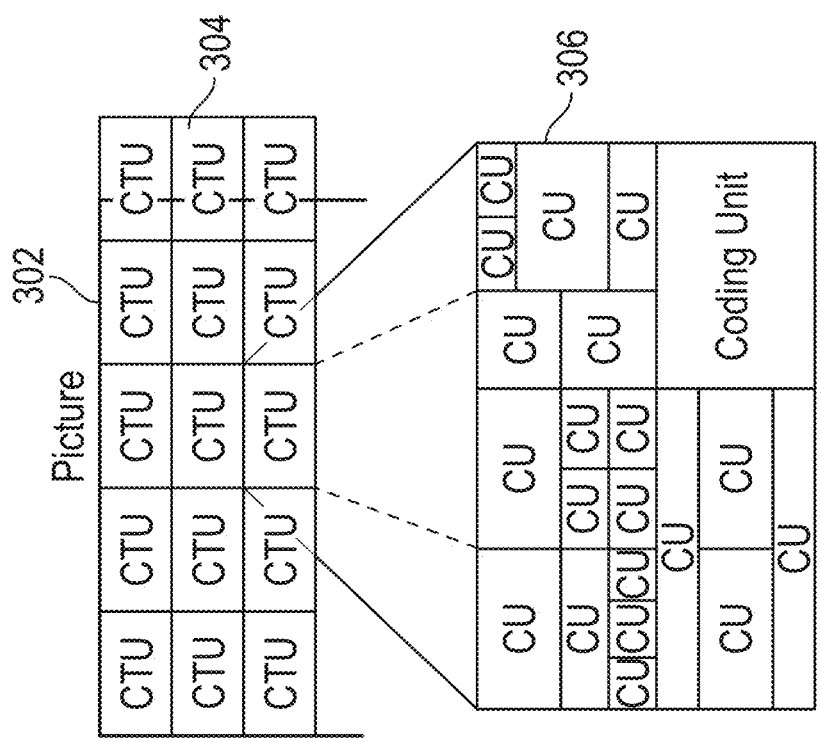

The VVC standard employs a block-based hybrid coding structure. FIG. 3A is a schematic diagram illustrating a partitioning structure according to aspects of the subject technology. As illustrated in FIG. 3A, picture 302 is divided into CTUs (coding tree units) 304. According to aspects of the subject technology, each CTU may be up to 128×128 pixels in size. Each CTU may be decomposed into CUs (coding units) 306 of different sizes by using a quad-tree plus binary and triple tree (QTBTT) recursive block partitioning structure. Different block splits under the QTBTT recursive block partitioning structure are illustrated in FIG. 3B. For example, a CU can have a two-way split by using a horizontal binary tree partitioning 320 or vertical binary tree partitioning 330. A CU can have a three-way split by using a horizontal ternary tree partitioning 340 or vertical ternary tree partitioning 350. Finally, a CU can have a four-way split by using a quad-tree partitioning 360.

A CU can be as large as a CTU, and as small as 4×4 block size according to aspects of the subject technology. Within a CTU, some CUs can be intra-coded, while others can be inter-coded. Therefore, the current CU may have both inter-coded and intra-coded neighboring CUs.

In VVC, there is generally no concept of splitting a CU into prediction units (PUs) and Transform Units (TUs) at CU level like in the HEVC standard. A CU is normally also a PU and a TU, except for the following three cases. First, the CU size may be larger than the maximum TU size allowed (e.g. CU size is 128×128, but the maximum TU size is 64×64), a CU in this case is forced to split into multiple PUs and/or TUs. Second, in the ISP (Intra Sub-Partition) mode, a CU/PU can be split into four TUs horizontally or vertically. Third, in the SBT (Sub-Block Transform) mode, part of a CU/PU can be forced to have zero residual, resulting in TU size smaller than CU/PU size as the transform is applied to the rest part of the CU/PU.

Figure 4:
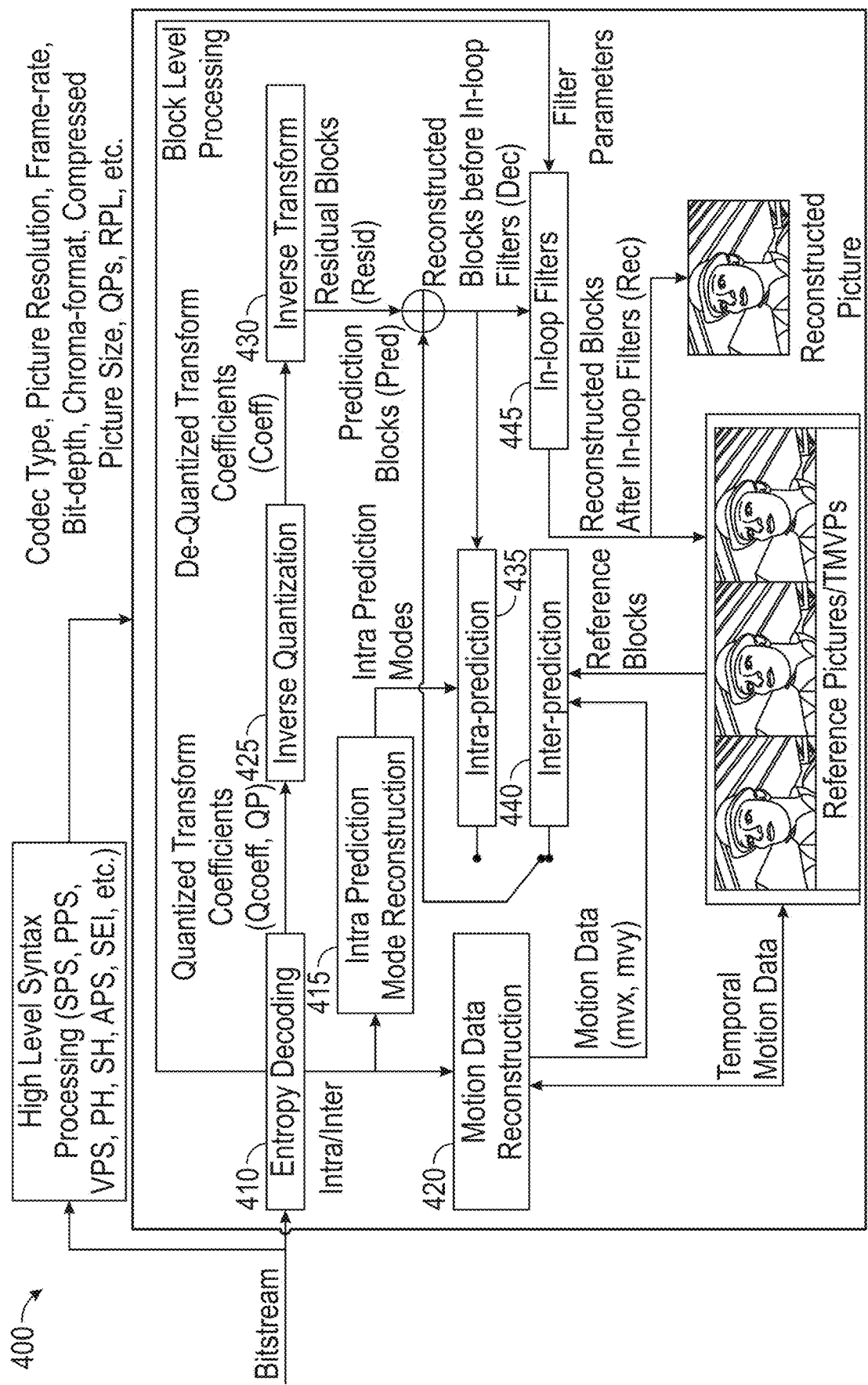
FIG. 4 illustrates a schematic diagram of an example of a VVC decoder according to aspects of the subject technology.

FIG. 4 is a block diagram illustrating information obtained at different decode stages in a VVC decoder according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

To decode a bitstream, decoder 400 may first parse the high-level syntax to obtain high-level information such as a codec type (e.g. VVC), picture resolution, frame-rate, bit-depth (e.g. 8-bit or 10-bit), chroma-format (e.g. 4:2:0), compressed picture size, quantization parameters (QPs), reference picture lists (RPLs) etc. The high-level syntax elements may include Sequence Parameter Sets (SPS), Picture Parameter Sets (PPS), Video Parameter Sets (VPS), Picture Headers (PH) Slice Headers (SH), Adaptation Parameter Sets (APS), Supplemental Enhancement Information (SEI) messages etc. The decoded high-level information is then used for configuring the decoder to perform block-level decode processing.

At block-level, entropy decoding engine 410 decodes the incoming bitstream and delivers the decoded symbols (i.e. syntax elements) including quantized transform coefficients and control information such as delta intra prediction modes (relative to the most probable modes), inter prediction modes, motion vector differences (MVDs, relative to the motion vector predictors), merge indices (merge_idx), quantization parameters, in-loop filter parameters etc. The intra prediction mode for a block is reconstructed at intra prediction mode reconstruction stage 415 by deriving a MPM (Most Probable Mode) list and using the decoded delta intra prediction mode. The motion data (motion vectors, reference index (indices)) is reconstructed in motion data reconstruction stage 420 by deriving an AMVP (Advanced Motion Vector Predictor) list, a merge/skip list or a sub-block MVP list and using MVDs. The decoded motion data of the current picture may serve as the temporal motion vector predictors (TMVPs) of decoding of future pictures and are stored in the decoded picture buffer (DPB).

The quantized transform coefficients go through the processing of inverse quantization in the inverse quantization stage 425 and inverse transform in the inverse transform stage 430 to reconstruct the residual blocks. Based on signaled intra or inter prediction modes, a decoder may perform intra prediction in the intra-prediction stage 435 or inter prediction (i.e. motion compensation) in the inter-prediction stage 440 to produce the prediction blocks. The residual blocks and the prediction blocks are then added together to generate the reconstructed blocks before in-loop filters 445. Finally, in the in-loop filtering stage 445, in-loop filters, such as de-blocking filter, SAO (Sample Adaptive Offset) filter and adaptive loop filter (ALF), may be performed on the reconstructed blocks to generate the reconstructed blocks after in-loop filters. The reconstructed picture is stored in the DPB to serve as reference picture for motion compensation of future pictures and sent to display.

Figure 5:
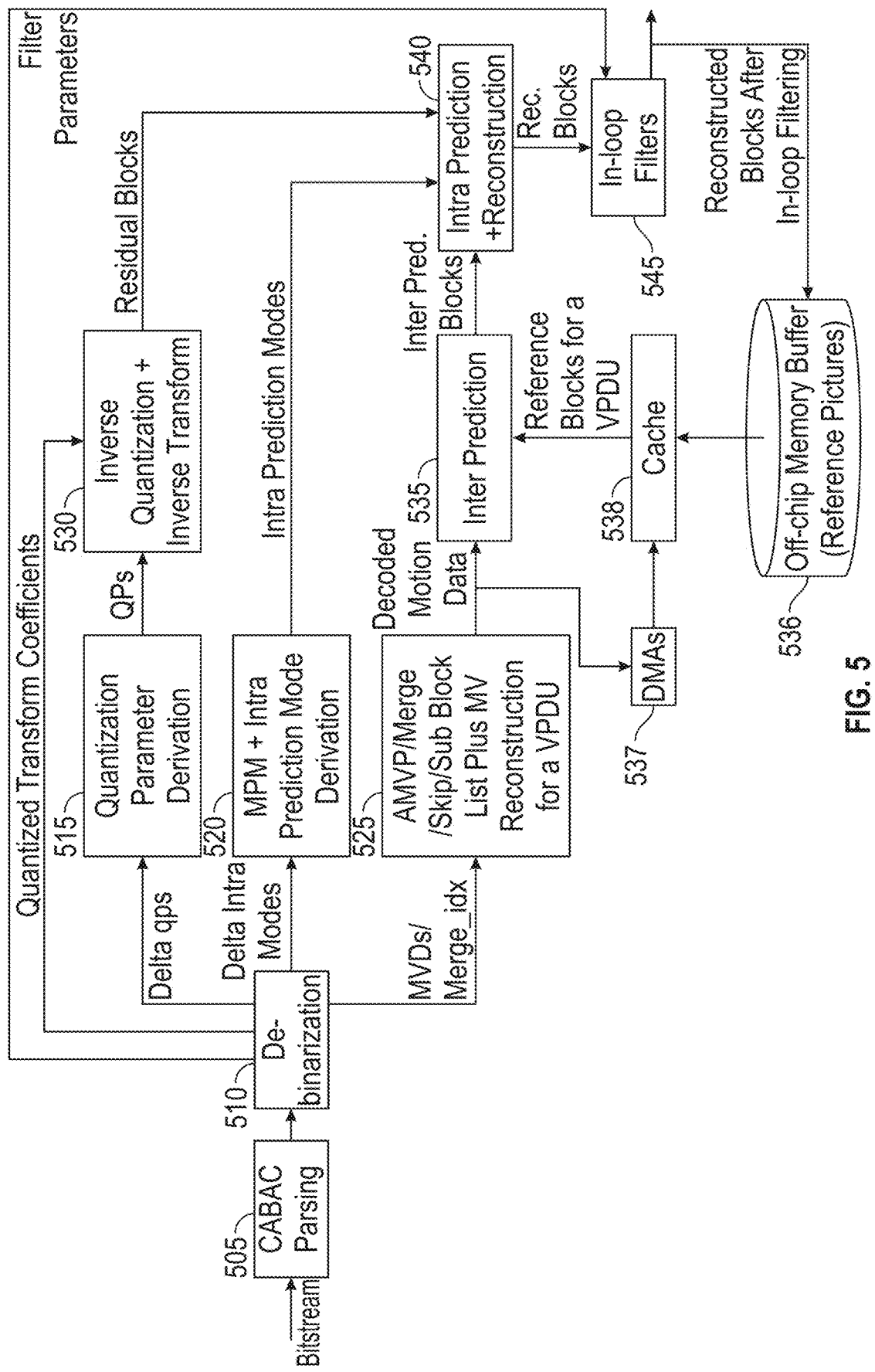
FIG. 5 illustrates an example of video decoder functional block partitioning in a pipelined decoder implementation according to aspects of the subject technology.

FIG. 5 illustrates an example of video decoder functional block partitioning in a pipelined decoder implementation according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The block-level decoding processing may be divided into two parts, namely, the entropy decoding and the back-end sample processing. The sample processing part includes the following four processing steps: side information derivation, inverse quantization/transform and inter-prediction, intra prediction and reconstruction, and in-loop filters.

Entropy decoding, performed by a context adaptive binary arithmetic coding (CABAC) stage 505 and de-binarization stage 510, converts an incoming bitstream into syntax elements and supply data for sample processing. The syntax elements may include e.g. in-loop filter parameters, delta quantization parameters, quantized transform coefficients, intra/inter prediction modes, delta intra prediction modes, motion vector differences (MVDs), merge/skip indices etc.

The back-end sample processing converts the decoded syntax elements into the reconstructed blocks. In VVC, all the sample-processing steps are deigned to be able to pipeline at the Video Processing Decoding Unit (VPDU) level (e.g. 64×64) on the decoder side to ensure high-throughput real-time decoding. As shown in FIG. 5, the first step of back-end sample processing, i.e. the side information derivation, is to convert the syntax elements into quantization parameters, intra prediction modes and motion data in stages 515, 520, and 525, respectively. For the quantization parameter (QP) derivation, stage 515 first derives a QP predictor by using the left and top neighboring block QP information, then reconstructs the QP for the current quantization group by adding the QP predictor and delta QP together. For the intra prediction mode derivation, stage 520 first derives a MPM (Most Probable Mode) list by using the neighboring intra prediction mode information from the top and left neighbors, and then reconstructs the intra prediction mode for the current block by adding the delta intra prediction mode to the selected candidate in the MPM list. Likewise, for the motion data reconstruction, stage 525 derives an AMVP (Advanced Motion Vector Predictor) list for regular prediction mode, a merge/skip list for merge/skip prediction mode or a sub-block list for affine mode first, then reconstructs the motion data for the current block by adding the MVDs to the selected candidate in the AMVP, merge/skip list or in the sub-block MVP list.

The side information derivation involves the QP predictor deviation, the intra MPM list derivation and the inter AMVP/merge/skip list derivation, which are dependent on the decoded QP, intra prediction mode or motion data information of the top and left neighbors. Accordingly, the derivation presents a decoder bottleneck because the predictor and list derivations are block-by-block sequential operation.

In the second step of the back-end sample processing, inverse quantization and inverse transform stage 530 converts the quantization transform coefficients blocks into the predication residual blocks, and inter-prediction stage 535 performs motion compensation to produce inter prediction blocks by taking the motion data and reference blocks (fetched from off-chip memory buffer 536 by direct memory access (DMA) engine 537 via cache 538) as input. This processing step does not depend on the neighboring block information, and hence can be fully parallelized.

In the third step of the back-end sample processing, intra prediction and reconstruction stage 540 takes the intra prediction modes and the left/top neighboring reference samples (before in-loop filtering) as input and produces the intra prediction blocks for intra-coded blocks. The reconstruction step adds the prediction residual blocks to intra or inter prediction blocks (depending on the intra/inter coding type of the blocks) to produce the reconstructed blocks before in-loop filtering. The intra prediction/reconstruction presents another bottleneck of the decoder, as the intra prediction uses the left/top neighboring reference samples for prediction that forces the operation to be block-by-block sequential.

In the final step of the back-end sample processing, in-loop filters 545 (such as de-blocking, SAO and ALF) perform filtering along the block edges to produce the reconstructed blocks after in-loop filtering. The in-loop filtering depends on the neighboring block information as filtering along an edge uses samples from both sides of the edge, but the filtering itself can be fully parallelized.

Figure 6:
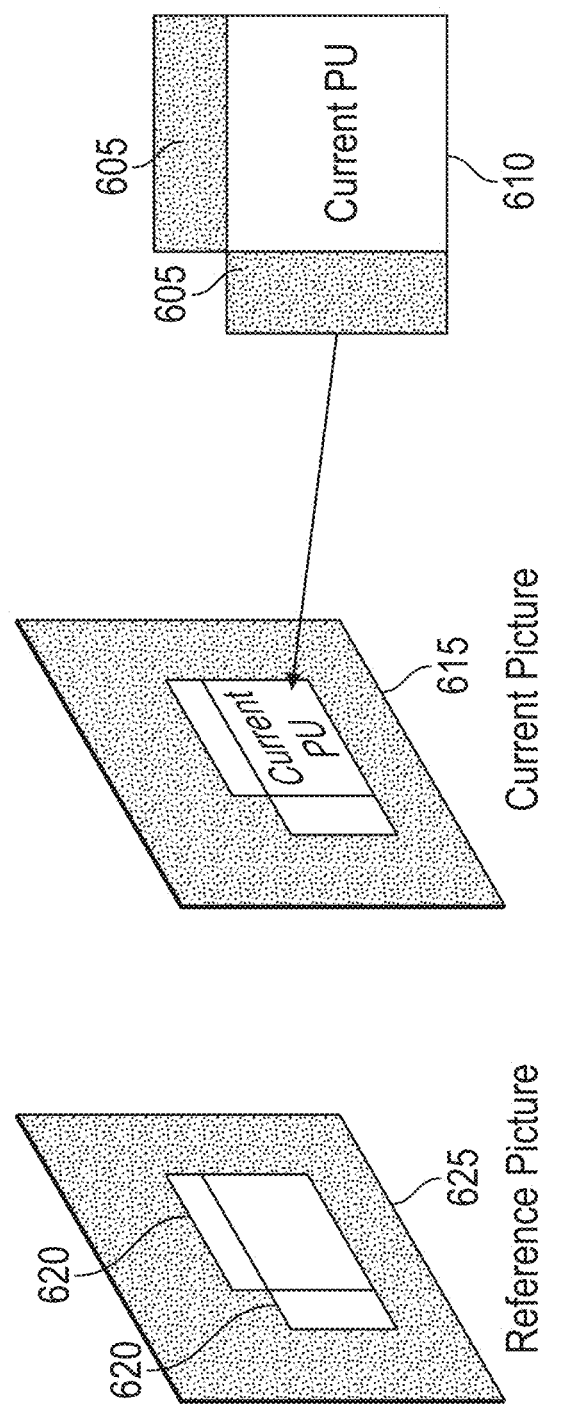
FIG. 6 is a diagram illustrating the structures involved in Decoder side motion vector refinement with Template Matching (DTM) according to aspects of the subject technology.

Decoder side motion vector refinement with Template Matching (DTM) is a coding efficiency enhancement tool that has gained some attention because of relatively high coding gain. FIG. 6 is a diagram illustrating the structures involved in DTM. As illustrated in FIG. 6, current template 605 is made up of top and/or left neighboring blocks of current PU 610 in current picture 615. The DTM is utilized to refine motion information of current PU 610 by finding the best match between current template 605 in current picture 615 and reference template 620, which is the same size as the current template, in reference picture 625 within a local search region. If an inter-coded PU is signaled using the DTM mode, the motion data decoded from the AMVP mode or merge/skip mode (i.e. the decoded motion data), for example, is further refined by using the DTM. The refined motion data instead of the decoded motion data is used for inter-prediction (motion compensation). Otherwise, the decoded motion data is directly used for motion compensation of the PU. If the DTM mode is used for the current PU, the refined motion data rather than the decoded motion data of the current PU may be fed back to the AMVP, merge/skip or sub-block candidate list derivation of the next PU.

FIG. 7 is a diagram illustrating aspects of the DTM refinement search. The refinement search may be centered on the decoded motion vector. As shown in FIG. 7, the decoder may load reference block 710 based on the decoded motion vector cMV, then performs a refinement search with a search range (e.g., [−8, 8]) in integer-pixel precision around the cMV. The template matching measures the cost between the templates of current PU 720 and the template of displaced PU 730 (i.e. the reference template) and selects the best match that has the minimum cost to produce the refined motion vector MV. Any proper metric may be used for measuring the cost, such as SAD (sum of absolute differences), SATD (sum of absolute transformed differences), etc.

Figure 8:
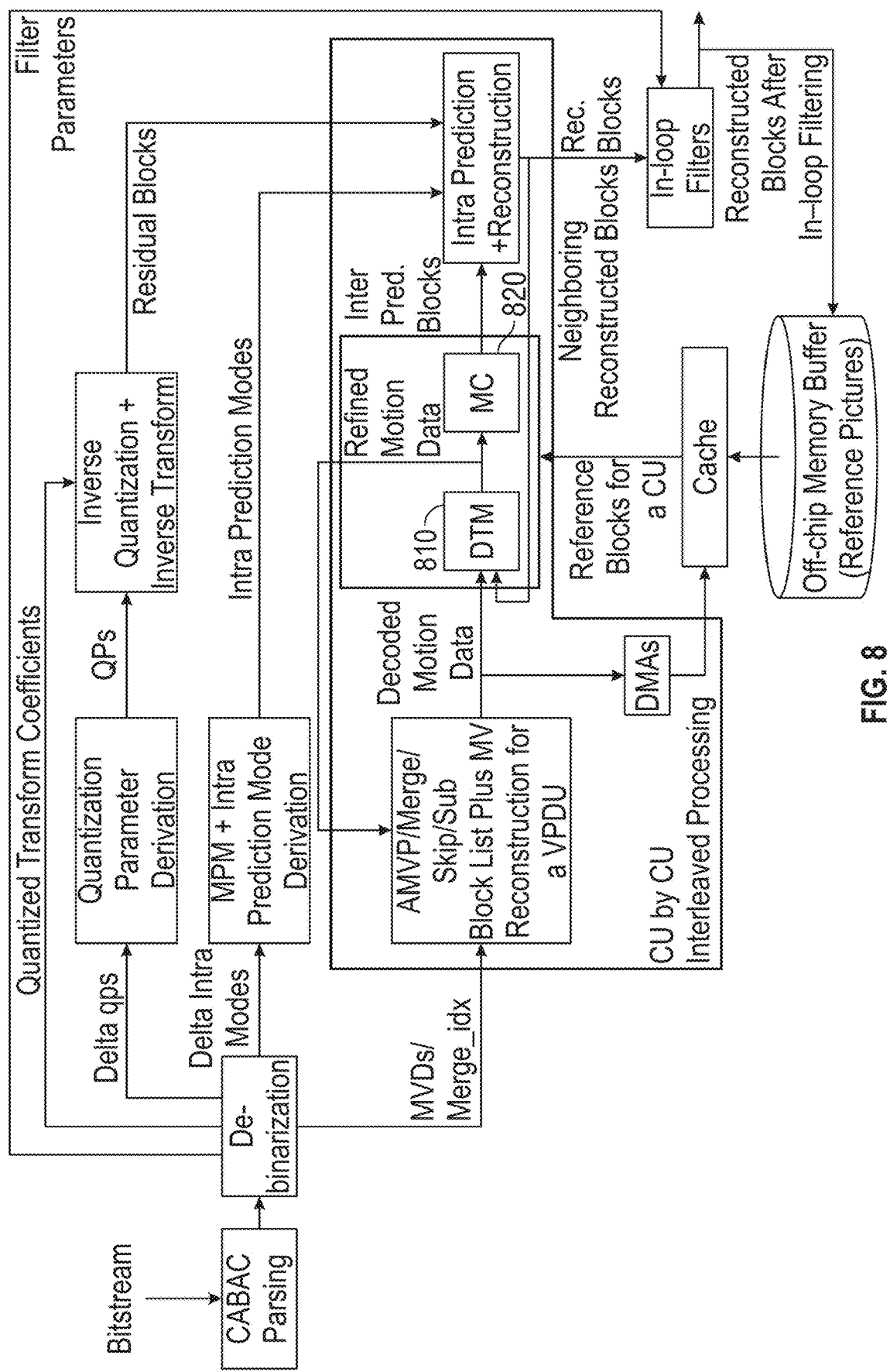
FIG. 8 illustrates an example of video decoder functional block partitioning in a pipelined decoder implementation according to aspects of the subject technology.

FIG. 8 illustrates an example of video decoder functional block partitioning in a pipelined decoder implementation with DTM in use according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Many of the components depicted in FIG. 8 are the same as components with the same name described above with respect to FIG. 5. The following description focuses on the differences between the implementation depicted in FIG. 5 and the implementation depicted in FIG. 8 without repeating the description of the common elements.

As illustrated in FIG. 8, DTM stage 810 supplies the refined motion data for the list derivations and uses neighboring reconstructed samples as a template for template matching. Accordingly, the VPDU level pipelining of the list derivation, inter-prediction and intra prediction/reconstruction is no longer possible. As further illustrated in FIG. 8, the DTM creates two CU-level feedback paths in the decoding process. The first feedback path is to feed the refined motion data after DTM to the list derivations of future PUs. The second feedback path is to feed the reconstructed samples of the top/left neighboring PUs from the intra prediction/reconstruction stage to the DTM for motion vector refinement. The feedback paths force the decoder to operate the list derivation, inter prediction (i.e. DTM stage 810 plus motion compensation (MC) stage 820), and the intra prediction/reconstruction CU by CU sequentially. This not only greatly decreases the decoder throughput, but also creates a serious memory latency issue as the DMAs (Direct Memory Access) for the reference block fetches cannot be issued in advance for the entire VPDU before performing the DTM and MC.

The AMP/merge/skip/sub-block list derivation and intra prediction/reconstruction are two bottlenecks for real-time video decoding, and the reference block fetches have a very high latency. The CU by CU interleaved operations of the list derivation, reference block fetch, inter prediction and intra prediction/reconstruction make the high throughput decoder implementation impossible.

Figure 9:
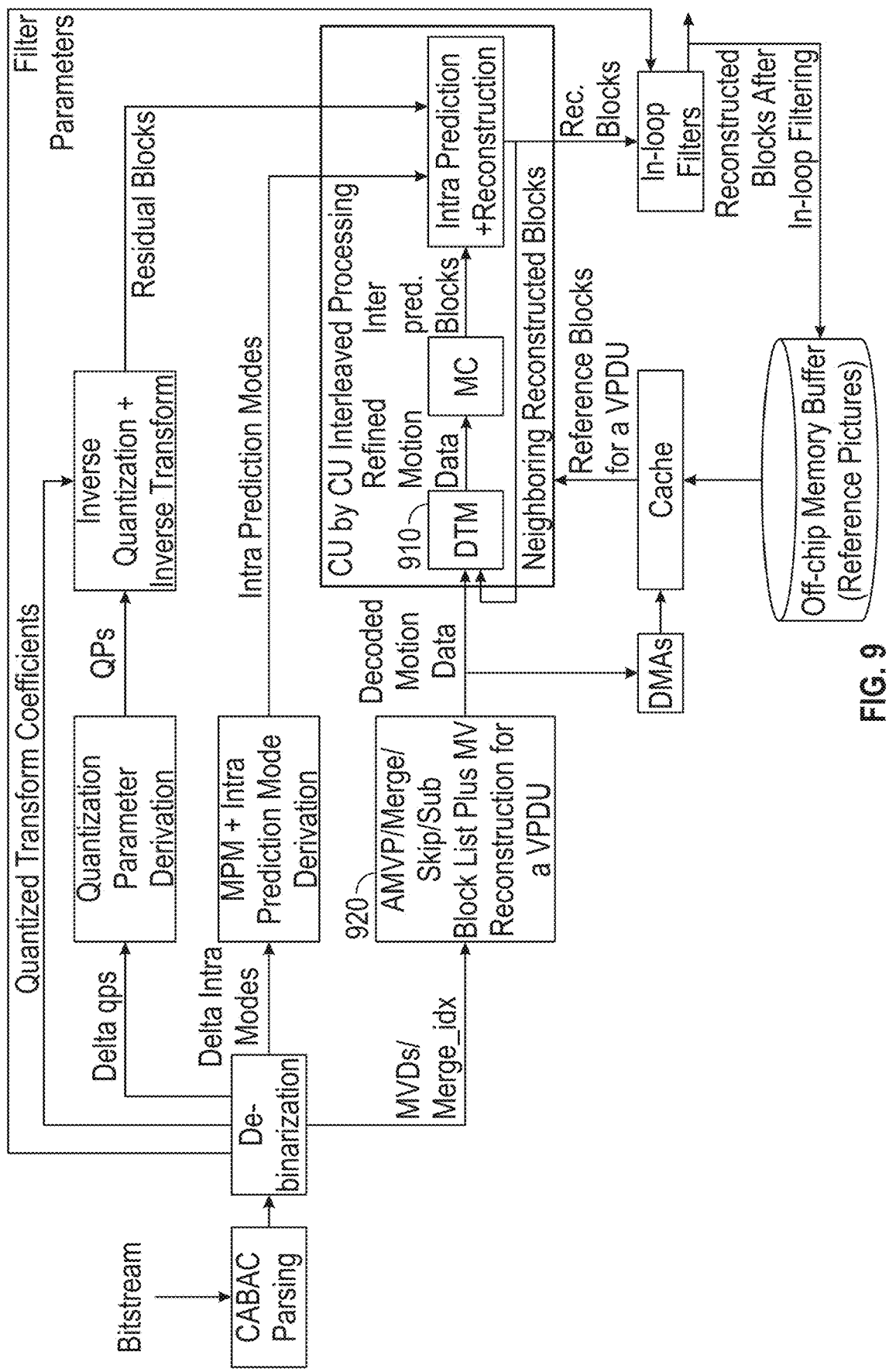
FIG. 9 illustrates an example of video decoder functional block partitioning in a pipelined decoder implementation according to aspects of the subject technology.

FIG. 9 illustrates an example of video decoder functional block partitioning in a pipelined decoder implementation with DTM in use according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Many of the components depicted in FIG. 9 are the same as components with the same name described above with respect to FIGS. 5 and 8. The following description focuses on the differences between the implementation depicted in FIGS. 5 and 8 and the implementation depicted in FIG. 9 without repeating the description of the common elements.

According to aspects of the subject technology, the feedback path of the refined motion data from DTM stage 910 to AMVP/merge/skip/sub-block list derivation and motion data reconstruction stage 920, illustrated in FIG. 8, may be removed to resolve the memory latency issue noted above, as illustrated in FIG. 9. After the removal of the feedback path of the refined motion data, DTM stage 910 is decoupled from the motion data reconstruction process and reference block fetch, the decoded motion data can be reconstructed and reference block fetches can issued for the entire VPDU in advance instead of CU by CU, effectively avoiding the memory latency issues. According to aspects of the subject technology, the same decoded motion data may be used for fetching reference block data and for the DTM (as initial vectors) of a VPDU.

The DTM may use shorter tap filters than those used in the motion compensation (MC) to reduce the computational complexity of the refinement search. However, this may result in the motion compensation using the refined motion data accessing reference samples beyond the reference blocks loaded based on the decoded motion data (i.e. unrefined motion data). To avoid the extra memory bandwidth for fetching those extra reference samples, reference block padding may be utilized to fill the missing samples. For example, the missing samples may be filled with the closest boundary samples of the fetched reference blocks.

The foregoing solution of removing the feedback path of refined motion data resolves the memory latency issue note above but does not address all of the throughput issue. As illustrated in FIG. 9, the inter prediction (i.e. DTM plus MC) stage is still interleaved with the intra prediction/reconstruction stage at the CU level because the DTM stage requires the reconstructed samples of the neighboring PUs as a template, and some of the neighboring PUs may be coded in an intra mode.

Figure 10:
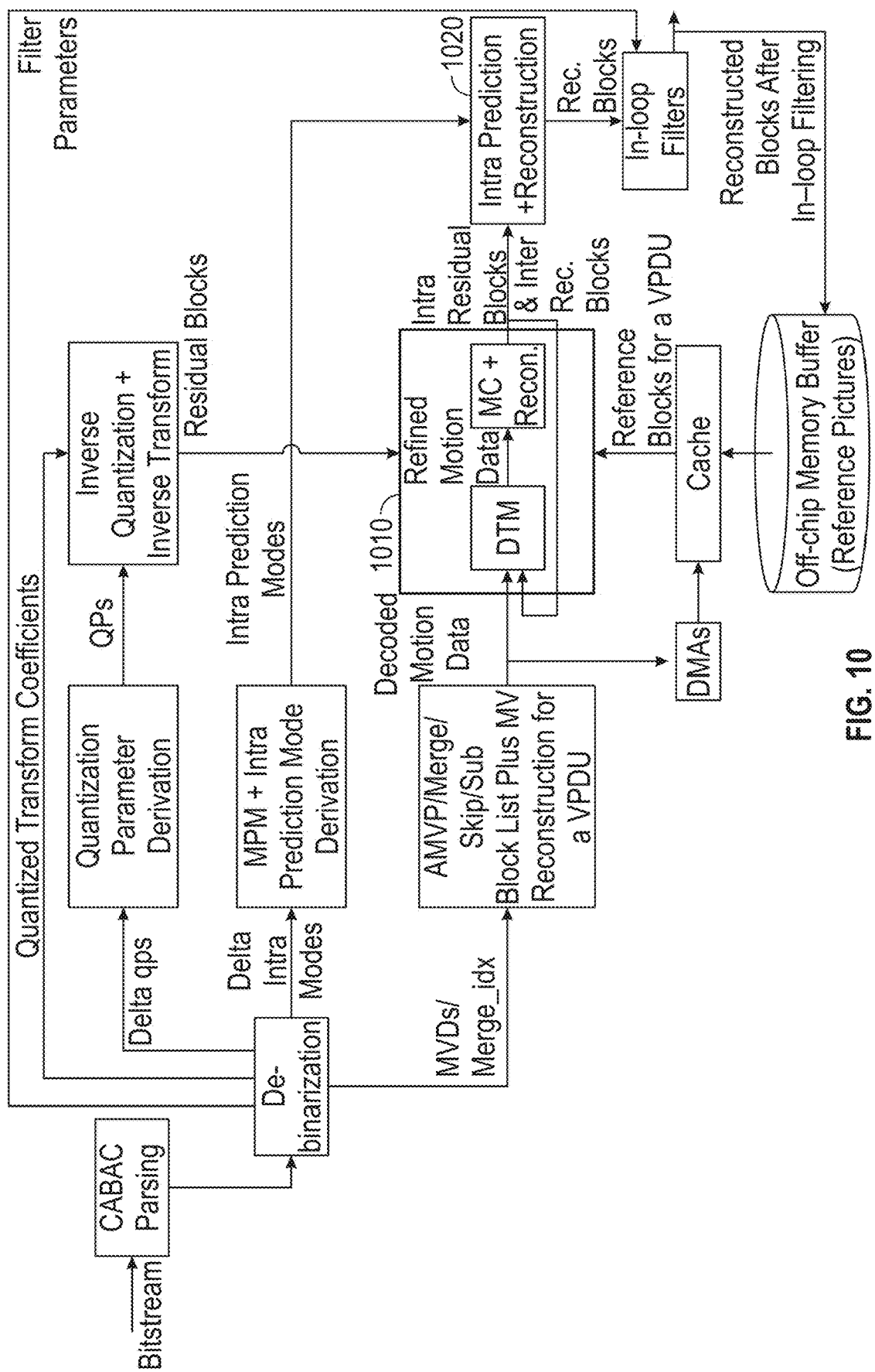
FIG. 10 illustrates an example of video decoder functional block partitioning in a pipelined decoder implementation according to aspects of the subject technology.

FIG. 10 illustrates an example of video decoder functional block partitioning in a pipelined decoder implementation with DTM in use according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Many of the components depicted in FIG. 10 are the same as components with the same name described above with respect to FIGS. 5, 8, and 9. The following description focuses on the differences between the implementation depicted in FIGS. 5, 8, and 9 and the implementation depicted in FIG. 10 without repeating the description of the common elements.

According to aspects of the subject technology, only reconstructed samples from inter-coded neighboring PUs may be used as templates for template matching. If a template contains reconstructed samples from intra-coded neighboring PUs, those samples shall be treated as unavailable and the cost calculation between the template of the current PU and the reference template shall not include those sample positions. In the event that all of the samples in the template of the current PU are from intra-coded neighboring PUs, the DTM for the current PU may be disabled. The signaling of DTM on/off in this case could be implicit. This solution makes the DTM independent of the intra prediction/reconstruction and therefore restores the VPDU level pipelining for the inter prediction and intra prediction/reconstruction.

The foregoing solution involves architecture changes in the pipelined decoder implementation. As illustrated in FIG. 10, the residual blocks are now passed to inter prediction stage (i.e. DTM plus MC) 1010 instead of to intra prediction/reconstruction stage 1020, and inter prediction stage 1010 performs the reconstruction for the inter-coded PUs so that the reconstructed samples are readily available for the DTM in inter prediction stage 1010. Instead of passing the inter prediction blocks, inter prediction stage 1010 now passes the inter reconstructed blocks and the intra residual blocks to intra prediction/reconstruction stage 1020.

In this solution, the DTM and motion compensation/reconstruction is still CU by CU interleaved because the DTM uses the reconstructed samples from the neighboring inter-coded PUs as a template. The block by block interdependent inter prediction caused by the DTM may create a throughput issue for small block size PUs in which the cycle budget is tight. According to aspects of the subject technology, the DTM for small block size PUs may be disabled to maintain throughput. For example, the DTM may be enabled only for PU sizes 8×8 and above.

Figure 11:
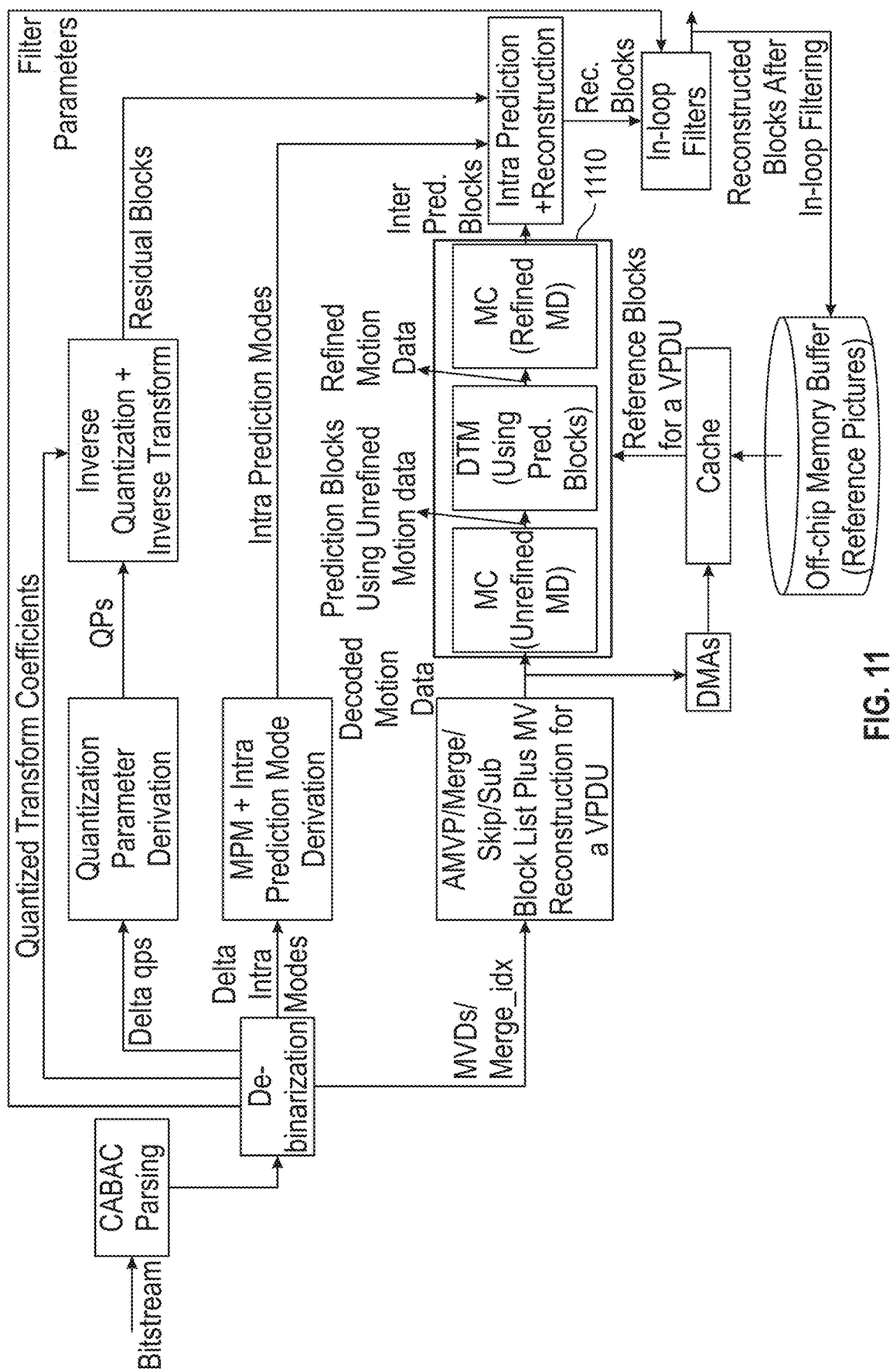
FIG. 11 illustrates an example of video decoder functional block partitioning in a pipelined decoder implementation according to aspects of the subject technology.

FIG. 11 illustrates an example of video decoder functional block partitioning in a pipelined decoder implementation with DTM in use according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Many of the components depicted in FIG. 11 are the same as components with the same name described above with respect to FIGS. 5, 8, 9, and 10. The following description focuses on the differences between the implementation depicted in FIGS. 5, 8, 9, and 10 and the implementation depicted in FIG. 11 without repeating the description of the common elements.

According to aspects of the subject technology, to maintain the full parallelism of the inter prediction, prediction samples (instead of the reconstructed samples) from the neighboring inter-coded PUs may be used as templates for template matching instead of reconstructed samples to maintain parallelism of inter prediction stage 1110. If a template contains prediction samples from intra-coded neighboring PUs, those samples shall be treated as unavailable and the cost calculation between the template of the current PU and the reference template shall not include those sample positions. In the event that all of the samples in the template of the current PU are from intra-coded neighboring PUs, the DTM for the current PU may be disabled. The signaling of DTM on/off in this case may be implicit.

As illustrated in FIG. 11, motion compensation (MC) is performed twice. First, motion compensation is performed before the DTM with the decoded motion data (i.e., unrefined motion data) to produce prediction blocks for template matching for the VPDU. Second, motion compensation is performed after the DTM with the refined motion data to produce final inter prediction blocks.

Figure 12:
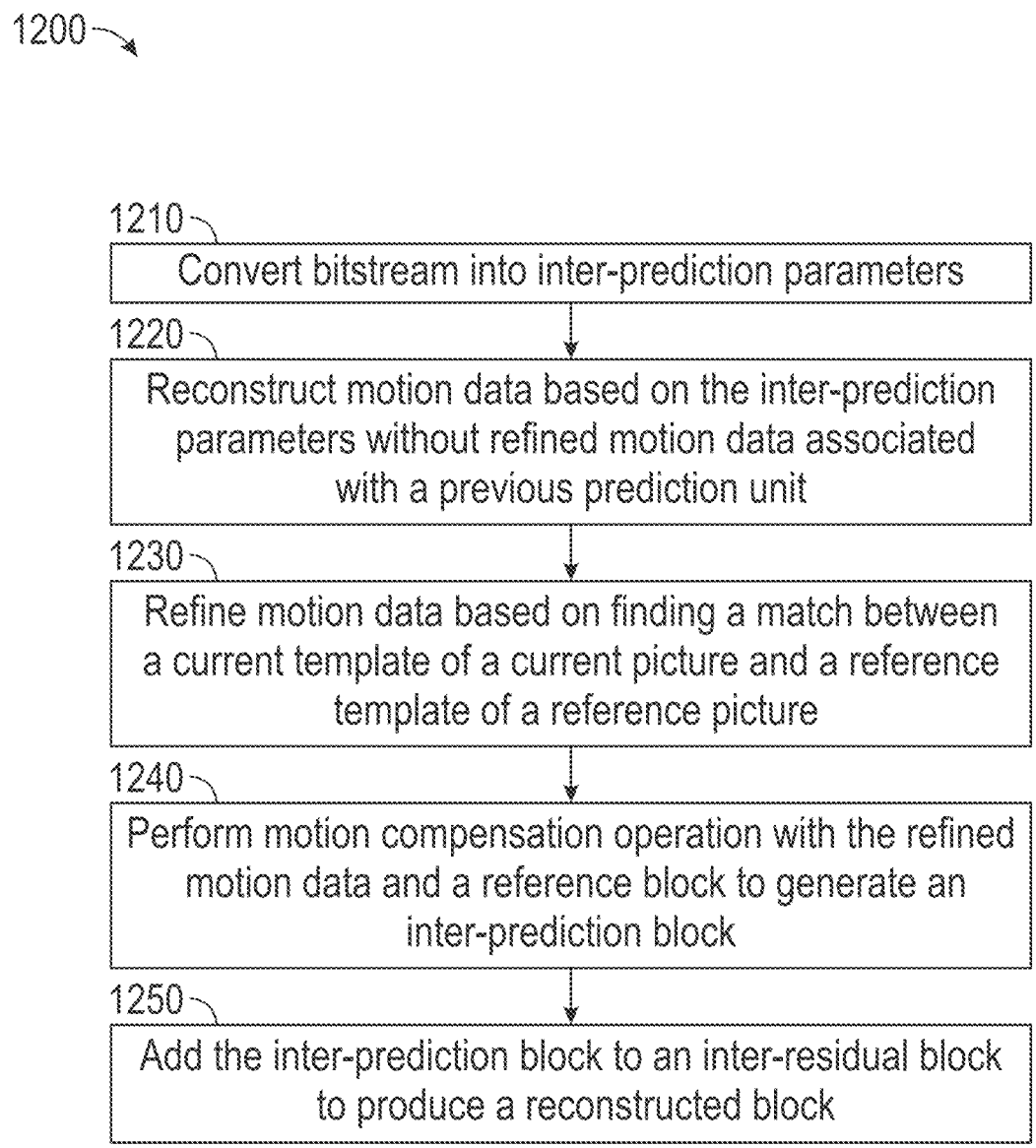
FIG. 12 is a flowchart illustrating a process according to aspects of the subject technology.

FIG. 12 illustrates an example process for syndicating content according to aspects of the subject technology. For explanatory purposes, the blocks of process 1200 are described herein as occurring in serial, or linearly. However, multiple blocks of process 1200 may occur in parallel. In addition, the blocks of process 1200 need not be performed in the order shown and/or one or more blocks of process 1200 need not be performed and/or can be replaced by other operations.

Initially, a received bitstream is converted into inter-prediction parameters (block 1210). For example, syntax elements in the bitstream may be converted into an AMVP (Advanced Motion Vector Predictor) list for regular prediction mode, a merge/skip list for merge/skip prediction mode or a sub-block list for affine mode. The motion data may then be reconstructed based on the inter-prediction parameters without refined motion data associated with a previous prediction unit (block 1220). The motion data for the current block may be reconstructed by adding the MVDs to the selected candidate in the AMVP, merge/skip list or in the sub-block MVP list.

The reconstructed motion data may be refined using the DTM process noted above. For example, the motion data may be refined based on finding a best match between a current template of a current picture and a reference template of a reference picture (block 1230). A motion compensation operation may be performed with the refined motion data and a reference block to generate an inter-prediction block (block 1240). The inter-prediction block may be added to an inter-residual block to produce a reconstructed block (block 1250).

Figure 13:
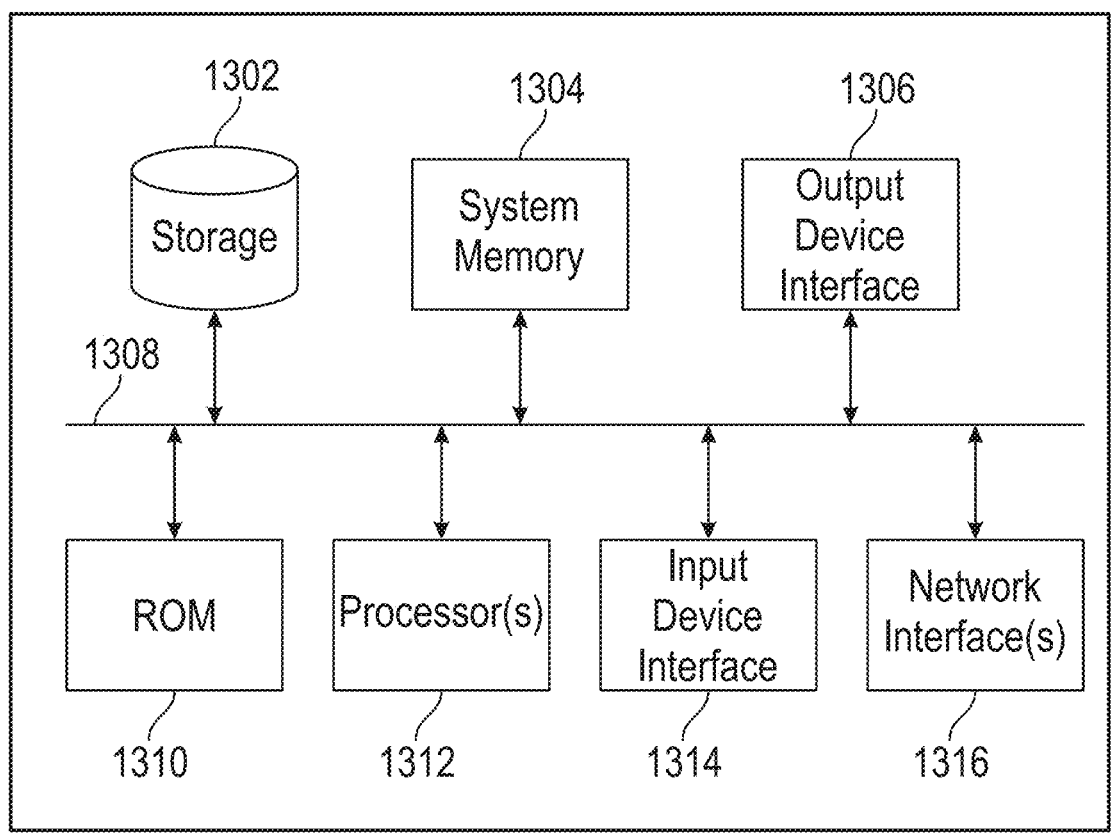
FIG. 13 is a block diagram that illustrates an electronic system with which aspects of the subject technology may be implemented.

FIG. 13 conceptually illustrates an electronic system 1300 with which one or more implementations of the subject technology may be implemented. The electronic system 1300, for example, can be a network device, a media converter, a desktop computer, a laptop computer, a tablet computer, a server, a switch, a router, a base station, a receiver, a phone, or generally any electronic device that transmits signals over a network. Such an electronic system 1300 includes various types of computer readable media and interfaces for various other types of computer readable media. In one or more implementations, the electronic system 1300 is, or includes, one or more of the devices 112 and/or 120. The electronic system 1300 includes a bus 1308, one or more processing unit(s) 1312, a system memory 1304, a read-only memory (ROM) 1310, a permanent storage device 1302, an input device interface 1314, an output device interface 1306, and a network interface 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multicore processor in different implementations.

The ROM 1310 stores static data and instructions that are needed by the one or more processing unit(s) 1312 and other modules of the electronic system. The permanent storage device 1302, on the other hand, is a read-and-write memory device. The permanent storage device 1302 is a non-volatile memory unit that stores instructions and data even when the electronic system 1300 is off. One or more implementations of the subject disclosure use a mass-storage device (such as a magnetic or optical disk and its corresponding disk drive) as the permanent storage device 1302.

Other implementations use a removable storage device (such as a floppy disk, flash drive, and its corresponding disk drive) as the permanent storage device 1302. Like the permanent storage device 1302, the system memory 1304 is a read-and-write memory device. However, unlike the permanent storage device 1302, the system memory 1304 is a volatile read-and-write memory, such as random access memory. System memory 1304 stores any of the instructions and data that the one or more processing unit(s) 1312 needs at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input device interface 1314 and the output device interface 1306. The input device interface 1314 enables a user to communicate information and select commands to the electronic system. Input devices used with the input device interface 1314 include, for example, alphanumeric keyboards and pointing devices (also called "cursor control devices"). The output device interface 1306 enables, for example, the display of images generated by the electronic system 1300. Output devices used with the output device interface 1306 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks (not shown) through one or more network interfaces 1316. In this manner, the computer can be a part of one or more network of computers (such as a local area network (LAN), a wide area network (WAN), or an Intranet, or a network of networks, such as the Internet). Any or all components of the electronic system 1300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a video decoder is provided that includes memory and a processor coupled to the memory. The processor may be configured to convert a bitstream into inter-prediction parameters and reconstruct motion data based on the inter-prediction parameters. The processor may further be configured to refine the motion data based on finding a match between a current template of a current picture and a reference template of a reference picture and perform a motion compensation operation with the refined motion data and a reference block to generate an inter-prediction block. The processor may be configured to add the inter-prediction block to an inter-residual block to produce a reconstructed block. The motion data may be reconstructed without refined motion data associated with a previous prediction unit.

The processor may be further configured to fetch a first set of reference blocks from the memory based on the reconstructed motion data, determine a second set of reference blocks to be accessed in the motion compensation operation includes at least one reference block not in the first set of reference blocks, and use padding for the at least one reference block in the motion compensation operation. The current template of the current picture may include reconstructed samples from neighboring prediction units. The processor may be further configured to exclude from the current template reconstructed samples from neighboring prediction units that are intra-coded.

The processor may be further configured to determine all of the samples in the current template are from neighboring prediction units that are intra-coded, disable refining the motion data, and perform the motion compensation operation with the reconstructed motion data and the reference block to generate the inter-prediction block. The processor may be further configured to pass inter-residual blocks and intra-residual blocks to an inter-prediction stage and pass the intra-residual blocks from the inter-prediction stage to an intra-prediction stage. The inter-prediction block may be added to the inter-residual block to produce the reconstructed block in the inter-prediction stage.

The current template of the current picture may include inter-prediction samples from neighboring prediction units. The processor may be further configured to exclude from the current template samples from neighboring prediction units that are intra-coded. The inter-prediction samples from neighboring prediction units may be generated using unrefined motion data.

The processor may be further configured to determine all of the samples in the current template are from neighboring prediction units that are intra-coded, disable refining the motion data, and perform the motion compensation operation with the reconstructed motion data and the reference block to generate the inter-prediction block. The processor may be further configured to determine a size of a current prediction unit does not meet a threshold, disable refining the motion data, and perform the motion compensation operation with the reconstructed motion data and the reference block to generate the inter-prediction block.

According to aspects of the subject technology, a method is provided that includes converting a bitstream into inter-prediction parameters, reconstructing motion data based on the inter-prediction parameters, and refining the motion data based on finding a match between a current template of a current picture and a reference template of a reference picture. The method further includes performing a motion compensation operation with the refined motion data and a reference block to generate an inter-prediction block and adding the inter-prediction block to an inter-residual block to produce a reconstructed block. The motion data may be reconstructed without refined motion data associated with a previous prediction unit.

The method may further include fetching a first set of reference blocks from the memory based on the reconstructed motion data, determining a second set of reference blocks to be accessed in the motion compensation operation includes at least one reference block not in the first set of reference blocks, and using padding for the at least one reference block in the motion compensation operation. The current template of the current picture may include reconstructed samples from neighboring prediction units. The method may further include excluding from the current template reconstructed samples from neighboring prediction units that are intra-coded.

The method may further include determining all of the samples in the current template are from neighboring prediction units that are intra-coded, disabling refining the motion data, and performing the motion compensation operation with the reconstructed motion data and the reference block to generate the inter-prediction block. The method may further include passing inter-residual blocks and intra-residual blocks to an inter-prediction stage and passing the intra-residual blocks from the inter-prediction stage to an intra-prediction stage. The inter-prediction block may be added to the inter-residual block to produce the reconstructed block in the inter-prediction stage.

The current template of the current picture may include inter-prediction samples from neighboring prediction units. The method may further include excluding from the current template samples from neighboring prediction units that are intra-coded. The inter-prediction samples from neighboring prediction units may be generated using unrefined motion data. The method may further include determining all of the samples in the current template are from neighboring prediction units that are intra-coded, disabling refining the motion data, and performing the motion compensation operation with the reconstructed motion data and the reference block to generate the inter-prediction block. The method may further include determining a size of a current prediction unit does not meet a threshold, disabling refining the motion data, and performing the motion compensation operation with the reconstructed motion data and the reference block to generate the inter-prediction block.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A video decoder, comprising:
   memory; and
   a processor coupled to the memory and configured to:
      convert a bitstream into inter-prediction parameters;
      reconstruct motion data based on the inter-prediction parameters;
      perform a first motion compensation operation with the reconstructed motion data and a reference block to generate a first inter-prediction block;
      refine the reconstructed motion data based on finding a match between a current template of a current picture and a reference template of a reference picture;

perform a second motion compensation operation with the refined motion data and the reference block to generate a second inter-prediction block; and add the second inter-prediction block to an inter-residual block to produce a reconstructed block, wherein the motion data is reconstructed without refined motion data associated with a previous prediction unit.

2. The video decoder of claim 1, wherein the processor is further configured to:

fetch a first set of reference blocks from the memory based on the reconstructed motion data;

determine a second set of reference blocks to be accessed in the second motion compensation operation with the refined motion data includes at least one reference block not in the first set of reference blocks; and use padding for the at least one reference block in the second motion compensation operation.

3. The video decoder of claim 1, wherein the processor is further configured to:

pass inter-residual blocks and intra-residual blocks to an inter-prediction stage; and pass the intra-residual blocks from the inter-prediction stage to an intra-prediction stage.

4. The video decoder of claim 3, wherein the inter-prediction block is added to the inter-residual block to produce the reconstructed block in the inter-prediction stage.

5. The video decoder of claim 1, wherein the current template of the current picture comprises inter-prediction samples from neighboring prediction units, and wherein the processor is further configured to exclude from the current template samples from neighboring prediction units that are intra-coded.

6. The video decoder of claim 5, wherein the inter-prediction samples from neighboring prediction units are generated using the reconstructed motion data.

7. The video decoder of claim 5, wherein the processor is further configured to:

determine all of the samples in the current template are from neighboring prediction units that are intra-coded;

disable refining the motion data; and perform the second motion compensation operation with the reconstructed motion data and the reference block to generate the inter-prediction block.

8. The video decoder of claim 1, wherein the processor is further configured to:

determine a size of a current prediction unit does not meet a threshold;

disable refining the motion data; and perform the second motion compensation operation with the reconstructed motion data and the reference block to generate the inter-prediction block.

9. A method, comprising:

converting a bitstream into inter-prediction parameters;

reconstructing motion data based on the inter-prediction parameters;

performing a first motion compensation operation with the reconstructed motion data and a reference block to generate a first inter-prediction block;

refining the motion data based on finding a match between a current template of a current picture and a reference template of a reference picture;

performing a second motion compensation operation with the refined motion data and the reference block to generate a second inter-prediction block; and adding the second inter-prediction block to an inter-residual block to produce a reconstructed block, wherein the motion data is reconstructed without refined motion data associated with a previous prediction unit.

10. The method of claim 9, further comprising:

fetching a first set of reference blocks from the memory based on the reconstructed motion data;

determining a second set of reference blocks to be accessed in the second motion compensation operation with the refined motion data includes at least one reference block not in the first set of reference blocks; and using padding for the at least one reference block in the second motion compensation operation.

11. The method of claim 9, further comprising:

passing inter-residual blocks and intra-residual blocks to an inter-prediction stage; and passing the intra-residual blocks from the inter-prediction stage to an intra-prediction stage.

12. The method of claim 11, wherein the inter-prediction block is added to the inter-residual block to produce the reconstructed block in the inter-prediction stage.

13. The method of claim 9, wherein the current template of the current picture comprises inter-prediction samples from neighboring prediction units, and wherein the method further comprises excluding from the current template samples from neighboring prediction units that are intra-coded.

14. The method of claim 13, wherein the inter-prediction samples from neighboring prediction units are generated using the reconstructed motion data.

15. The method of claim 13, further comprising:

determining all of the samples in the current template are from neighboring prediction units that are intra-coded;

disabling refining the motion data; and performing the second motion compensation operation with the reconstructed motion data and the reference block to generate the inter-prediction block.

16. The method of claim 9, further comprising:

determining a size of a current prediction unit does not meet a threshold;

disabling refining the motion data; and performing the second motion compensation operation with the reconstructed motion data and the reference block to generate the inter-prediction block.

* * * * *